INVENTORS.
CHARLES BRECHER
KENNETH W. FRENCH

BY R. J. Frank
ATTORNEY

United States Patent Office 3,558,504
Patented Jan. 26, 1971

3,558,504
METHOD OF PREPARING AN ACTIVE MEDIUM FOR A LIQUID LASER
Charles Brecher, Flushing, and Kenneth W. French, Mineola, N.Y., assignors to General Telephone & Electronics Laboratories Incorporated, a corporation of Delaware
Filed Dec. 5, 1968, Ser. No. 781,471
Int. Cl. C09k 1/04, 1/08
U.S. Cl. 252—301.4         11 Claims

ABSTRACT OF THE DISCLOSURE

A method for the preparation of a liquid laser medium containing an aprotic phosphorus oxychloride solvent acidified by the addition of a Lewis acid. A rare earth compound is dissolved in the aprotic solvent by the addition of water which reacts with the phosphorus oxychloride to promote solvation of the rare earth ions and increase the concentration thereof. The solution is returned to an aprotic state by distilling off all hydrogen-containing species from the solution. The resultant solution is an active laser medium having a relatively low threshold.

BACKGROUND OF THE INVENTION

This invention relates to a method of preparing an active medium for a liquid laser and, in particular, to an active medium comprising an aprotic phosphorus oxychloride solvent.

The recent discovery of a liquid laser medium comprising a solution of a rare earth ion in an acidified selenium oxychloride solvent has generated increasing interest in liquid lasers. The low threshold, high energy output and sharpness of the emission line characteristic of this medium compare favorably with the output characteristics of known single crystal and glass media. The selenium oxychloride active medium is described in detail in two articles by A. Heller and A. Lempicki appearing in Applied Physics Letters, vol. 9, pp. 106–110, Aug. 1, 1966.

Active liquid media eliminate the problems of single crystal growth and shaping, and are relatively easy to prepare in large volumes. A particularly important advantage arising from the use of a liquid medium is that it can be circulated and cooled. The inability to cool the central region of solid media places a limitation on the level of the input power. In addition, the liquid is immune from shattering or cracking under thermal or mechanical stress and exhibits self-repair. The self-repair feature overcomes the problem of the burning of holes, encountered in solid media, due to the high power of the narrow emitted light beams.

The selenium oxychloride based liquid laser has demonstrated the ability of liquid active media to perform essentially as well as solid media. However, active media prepared with a selenium oxychloride solvent exhibit both a high toxicity and a high corrosiveness. These characteristics increase the complexity of associated circulating systems and require that considerable care be taken in the preparation and handling of the medium. Consequently, the development of relatively nontoxic and noncorrosive liquid media having a low threshold and providing a high output is important in promoting the use of lasers in industrial applications.

In order to obtain a low threshold liquid medium, the quantum yield of fluorescence of the active ions in solution is required to be maintained at a relatively high level. A low quantum yield is due primarily to radiationless relaxations resulting from the high energy vibrations of bonds involving light atoms, typically hydrogen. Consequently, suitable solvents for practical liquid lasers are required to be aprotic or, in other words, contain no hydrogen atoms. This limitation has restricted the number of available solvents.

Further, the solvents employed heretofore have been required to possess relatively high dielectric constants so that the forces between the cation and anion of the rare earth compound would be relatively low and precipitation minimized. As a result, the concentration of active ions in such solutions is relatively high and a low threshold for laser action is obtained. Typically, the dielectric constant of the solvent is required to exceed 20 and, in fact, the dielectric constant if selenium oxychloride is 46. This requirement has further restricted the number of suitable solvents. Accordingly, the present invention is directed to a method of preparing an active medium employing a low dielectric constant solvent, phosphorus oxychloride, which is relatively nontoxic and noncorrosive.

SUMMARY OF THE INVENTION

The present invention concerns a method of making an active medium for a liquid laser which contains the aprotic solvent phosphorus oxychloride. The solvent is acidified by the addition of a Lewis acid to promote the dissolution of a compound containing the active ion in the solvent.

While phosphorus oxychloride is aprotic, relatively nontoxic and noncorrosive, its comparatively low dielectric constant if 14 has heretofore limited its use as a solvent in a low threshold liquid laser. The difficulty in providing a sufficient concentration of active ions in the solution arises from the low solubility product for the active ion compound in low dielectric constant solvents. Although the solubility of the compound is slightly increased by the addition of a Lewis acid to the phosphorus oxychloride, the concentration of active ions is not sufficient to provide a low threshold active medium. (A Lewis acid is defined as a substance which can accept an electron pair from a base. By combining the solvent anions it provides additional solvent cations in accordance with the ionization constant of the solvent.)

However, it has been found that the solubility and concentration of active ions in a mixture of phosphorus oxychloride and a Lewis acid can be substantially increased to provide a low threshold active laser medium by the addition of water, followed by the removal of hydrogen-containing species from the solution. While the presence of water in an active liquid medium is in opposition to the basic reason for utilizing aprotic solutions (the minimizing of high energy vibrations which result in a quenching of the fluorescence of the active ion by promoting radiationless relaxations of the excited ion), the addition of relatively small amounts of water to the solution (for example, in a proportion of one mole of water for every ten moles of phosphorus oxychloride) was found to be sufficient to substantially increase the solubility of the active ion and reduce its tendency to precipitate.

The water added to the solution reacts with the phosphorus oxychloride, $POCl_3$, to form by-product compounds. In a manner which is not completely understood, these byproducts promote the dissolution of the compound containing the active ions in the mixture of phosphorus oxychloride and a Lewis acid sufficiently to provide active ion concentrations greater than 1M. While these high concentrations are indicative of low threshold active media, the presence of light atoms in the medium results in the quenching of the fluorescence of the active ions. Accordingly, any remaining water and other hydrogen-containing species must be removed without reversing the reaction between the water and the phosphorus oxychloride which produces the solubilizing byproducts.

The removal of the hydrogen-containing species, including both hydrogen chloride and any remaining water, is effected by boiling the solution in an anhydrous atmosphere to remove a sufficient fraction of the solvent to carry off and eliminate essentially all of the contaminating species from the solution. The resulting solution is a stable, readily reproducible active laser medium having relatively long florescence decay times in excess of 250 $\mu$sec. The medium shows essentially no evidence of OH absorption bands in the infrared portion of spectrum.

This procedure of removing the hydrogen-containing species from the solution also removes substantial portions (as much as two-thirds) of the total volume including essentially all free $POCl_3$. Consequently, a high viscosity gel-like active medium is produced which can then be dissolved in acidified aprotic solvents such as $POCl_3$, $SO_2Cl_2$, or $SeOCl_2$ to obtain a laser solution having a desired viscosity and active ion concentration.

Further features and adavntages of the invention will become more readily apparent from the following detailed description of a specific embodiment of the invention when taken in conjunction with the accompanying drawings.

DESCRIPTION OF THE PREFERRED EMBODIMENT

Figure 1:
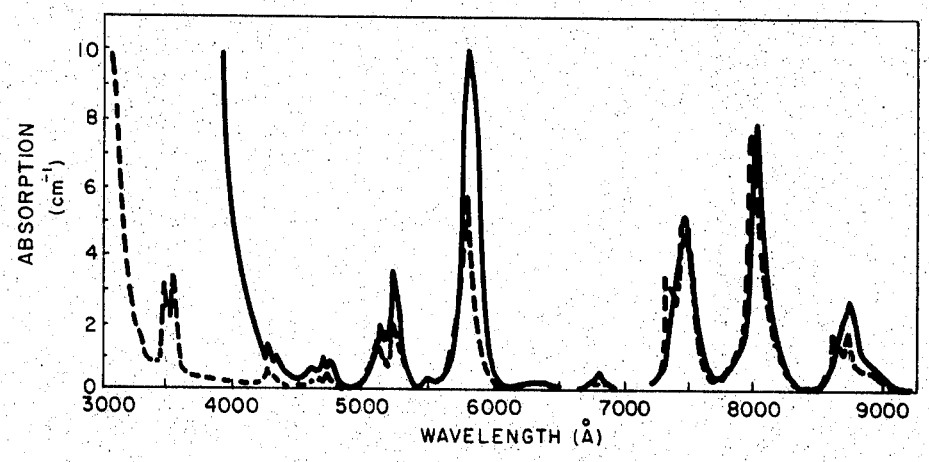
FIG. 1 shows absorption curves for selenium oxychloride and phosphorus oxychloride media.

The present active medium for a liquid laser contains active ions dissolved in a mixture of phosphorus oxychloride and a Lewis acid. Although this medium utilizes a low dielectric constant solvent, phosphorus oxychloride, the method of preparation described herein provides an aprotic medium having the high active ion concentration required for low threshold operation.

The phosphorus oxychloride, $POCl_3$, solvent is aprotic since it contains no hydrogen atoms. A Lewis acid is added to the solvent to increase the amount of the compound containing the active ion going into solution. The active ion is normally a rare earth ion and is contained in a compound; oxides and chlorides of the rare earth ion being generally preferred due to the relative ease with which they are prepared. When thec ompound is added to the mixture of phosphorus oxychloride and Lewis acid, it dissociates into cations and anions with the active ion being the cation. The cation forms a complex with ions in the solution. In other words, the cation is solvated by a surrounding zone of oriented ions supplied by the solution. The complex formed by the solvated cation is determined by the number of immediate neighbors the cation favors. In the case of a neodymium catio, which is the preferred active ion in most liquid media, the complex contains 8, 9 or 10 immediate neighbors. The immediate neighbor atom forms a coordinate bond with the cation by the sharing of a pair of electrons. In the present medium, utilizing phosphorus oxychloride, an oxygen atom forms the bond with the cation.

Since the energy threshold of an active medium is a function of the active ion concentration, the ability of a compound containing the active ion to go into solution without precipitating is an important criterion in selecting a liquid laser system. The Lewis acid promotes solubility by combining with the anion of the solvent, i.e., chloride, and, in effect, removing such anions from the solution. This provides additional solvent cations in accordance with the ionization constant of the solvent.

However, the low dielectric constant of phosphorus oxychloride has heretofore severely limited the concentration of active ions in solution even with the addition of a Lewis acid. As a result, phosphorus oxychloride has not been considered suitable for use in a low threshold liquid active medium. The present method of preparing a phosphorus oxychloride based medium overcomes this limitation and provides active ion concentration in excess of 1 M if desired.

In the preparation of the active medium, the compound containing the active ion is dispersed in a solvent comprising phosphorus oxychloride and Lewis acid. The volume of phosphorus oxychloride in the resultant mixture is approximately five times the volume of Lewis acid. However, this volume ratio may be varied to obtain different viscosity media as desired. Typical Lewis acids which may be utilized to acidify the solvent are $SnCl_4$, $SbCl_5$, $GeCl_4$, $TiCl_4$ and $SO_3$. Other Lewis acids may also be employed.

In order to enable the compound containing the active ion to dissolve in the solvent and produce a stable solution, a small amount of water (of a quantity dependent on the desired final concentration of active ion) is added. For example, to obtain a 0.3 M active ion concentration, water is added in an approximately 1 to 10 mole ratio with the phosphorus oxychloride. The addition of water in a less than 1 to 100 mole ratio with phosphorus oxychloride has been found to reduce the stable active ion concentration to less than 0.01 M and thus does not provide a low threshold medium. On the other hand, the addition of water in a greater than 1 to 2 mole ratio with phosphorus oxychloride leaves insufficient $POCl_3$ to react with the added water.

The water apparently reacts with the phosphorus oxychloride to produce a series of chlorinated phosphorus-oxygen compounds. These byproduct compounds affect the solvation shell of the active ion in a manner such that the solubility of the ion is greatly enhanced. The reaction which takes place between the phosphorus oxychloride and the water is believed initially to form pyrophosphoryl chloride ($P_2O_3Cl_4$). However, the reaction apparently continues to form a system including both chains and rings of condensed chloro-phosphoric acids. Typical reactions describing the formation of the byproduct compounds are set forth below.

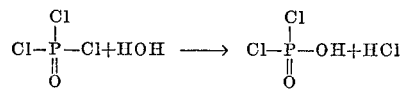

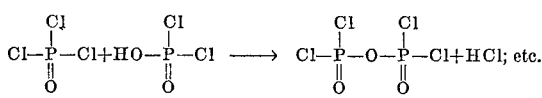

The system of condensed phosphoric acids, or a specific reaction product such as pyrophosphoryl chloride shown above, enters the solvation shell and keeps the active ions in solution. It shall be noted that no hydrogen atoms are contained in the compounds which enter the solvation shell.

Since the active medium is required to be aprotic in order to minimize radiationless relaxation of the excited active ion, it is necessary to remove essentially all hydrogen atoms from the medium. The reaction product HCl formed by the reaction between the phosphorus oxychloride and the water is readily removed from the prepared solution by boiling off a large fraction of the solution in an anhydrous atmosphere. The remaining material is in the form of a viscous gel-like substance which constitutes an active laser medium.

The reduce the viscosity to a desired value, as in the case of a circulating system, the "gel" can be diluted by phosphorus oxychloride or other aprotic solvents (such as $SO_2Cl_2$ or $SeOCl_2$). The amount of aprotic solvent added after the heating step also can be used to obtain a desired active ion concentration. In the preparation of a typical medium, in which tin tetrachloride is the Lewis acid, a fraction of the solvent is distilled off until a final boiling point of about 115° C. (which is the approximate boiling point of the tin tetrachloride) is reached. As a result, about two-thirds of the total volume of the solution is removed. The resultant material is a gel-like substance which is then added to an appropriate quantity of anhydrous phosphorus oxychloride.

Figure 4:
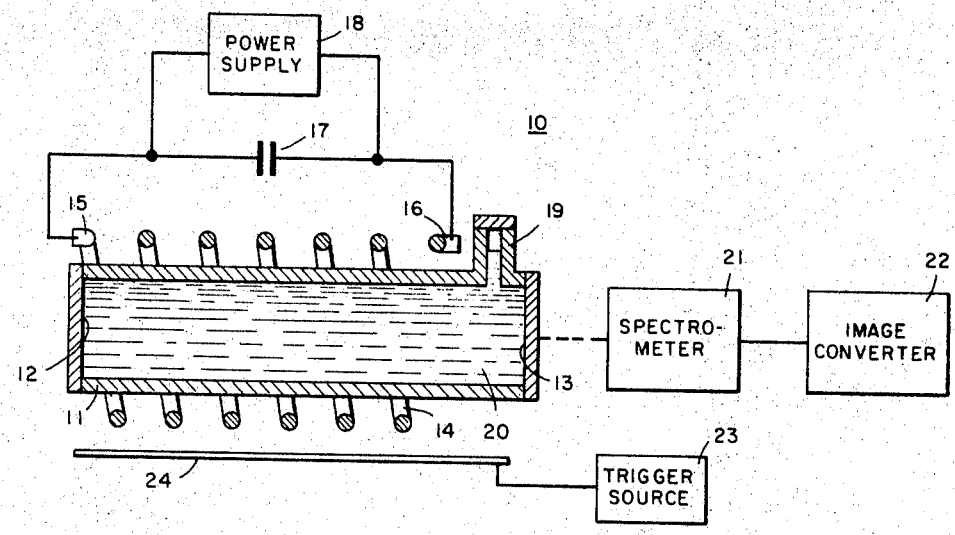
FIG. 4 is a schematic diagram of a liquid laser.

In the preparation of a phosphorus oxychloride-based liquid active medium tested and operated in the laser apparatus shown in FIG. 4, the Lewis acid employed was tin tetrachloride, $SnCl_4$, and the compound containing the active ion was neodymium oxide, $Nd_2O_3$. Five grams of neodymium oxide powder was added to a solvent consisting of 84 cubic centimeters of anhydrous phosphorus oxychloride and 16 cubic centimeters of tin tetrachloride. Approximately one cubic centimeter of distilled water was then slowly stirred into the mixture whereupon the $Nd_2O_3$ dissolved in the solution. Since the reactions involved are exothermic, care was exercised to maintain the solution at or just below its boiling point. When the $Nd_2O_3$ was fully dissolved, essentially all hydrogen-containing species were removed by boiling off approximately two-thirds of the total volume in a standard distillation apparatus equipped with a desiccating agent to maintain an anhydrous atmosphere. The distillation resulted in a final boiling point of 115° C. and took about 30 minutes. The resultant gel was then diluted to a total volume of 100 cubic centimeters with anhydrous phosphorus oxychloride to provide a 0.3 M solution.

The prepared solution was tested in a laser structure of the type shown in FIG. 4. This device comprises a hollow transparent cylinder 11 which may be made of any material which transmits light in the pumping region, such as quartz, Pyrex, and the like. In practice, the cylinder 11 may be formed of commercial glass tubing. First and second optically flat end seals 12 and 13 are fused to the ends of the cylinder. These end-seals may be either transparent to the radiation emitted by the laser or provided with reflecting coatings depending on the desired application. Typical cylinders have bore diameters of 2 to 10 mm. and lengths ranging between 2 and 12 inches.

The end-sealed cylinder is filled with the active liquid medium through side-arm 19 which is then sealed. If the medium is to be circulated, a second side-arm is provided and the side-arms used as input and output ports. A flash lamp 14 is placed around the cylinder, electrodes 15 and 16 being connected to the ends of the helical flash tube. Power supply 18 maintains a constant voltage of about 10 kilovolts across a capacitor 17 coupled between electrodes 15 and 16. The structure is maintained at room temperature.

When the lamp is flashed by applying a 20 kilovolt trigger pulse to wire 24 from trigger source 23, energy is absorbed by the active medium 20 and the stimulated emission is obtained through the end-seals 12 and 13. The wavelength of the stimulated emission is primarily determined by the action ion in the liquid medium which, in this embodiment, is neodymium.

The threshold for laser action with the medium prepared in accordance with the present method was found to be about 10 joules. This threshold is the same as for the known selenium oxychloride medium tested in a similar apparatus.

Figure 2:
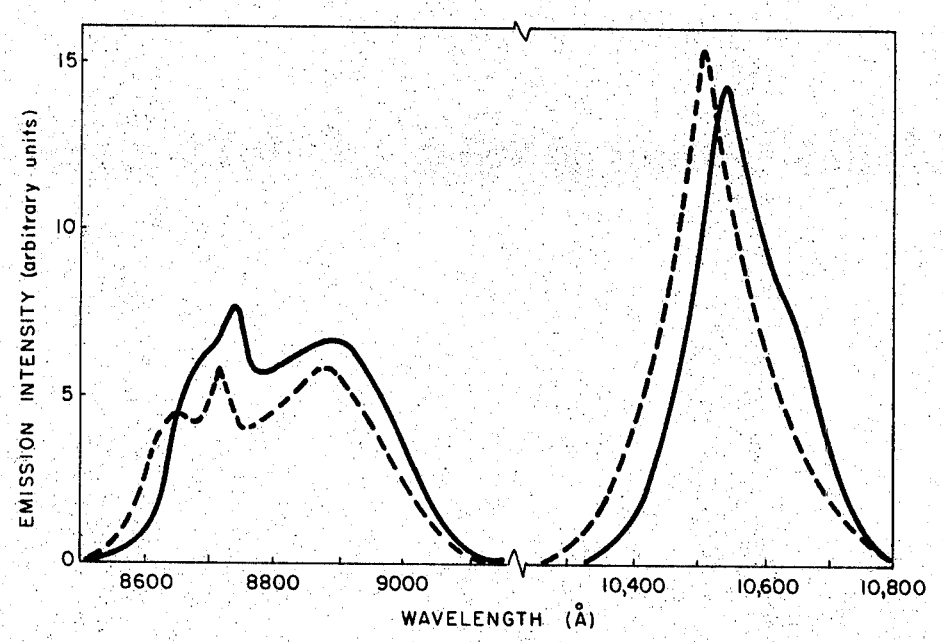
FIG 2 depicts emission curves for the media of FIG. 1.

The curves of FIGS. 1 and 2 compare the absorption and emission spectra of a selenium oxychloride medium (solid curve) and a phosphorus oxychloride medium (dashed curve) prepared by the present method. Both media contained neodymium as the active ion at a concentration of 0.3 M. It shall be noted from FIG. 1 that the transmission cutoff extends further into the ultraviolet region of $POCl_3$ then $SeOCl_2$. Accordingly, the $POCl_3$ medium permits the absorption of the Nd ion in the 3500 A. region to be used for pumping. The emission spectra for the two media shown in FIG. 2 are similar.

Figure 3:
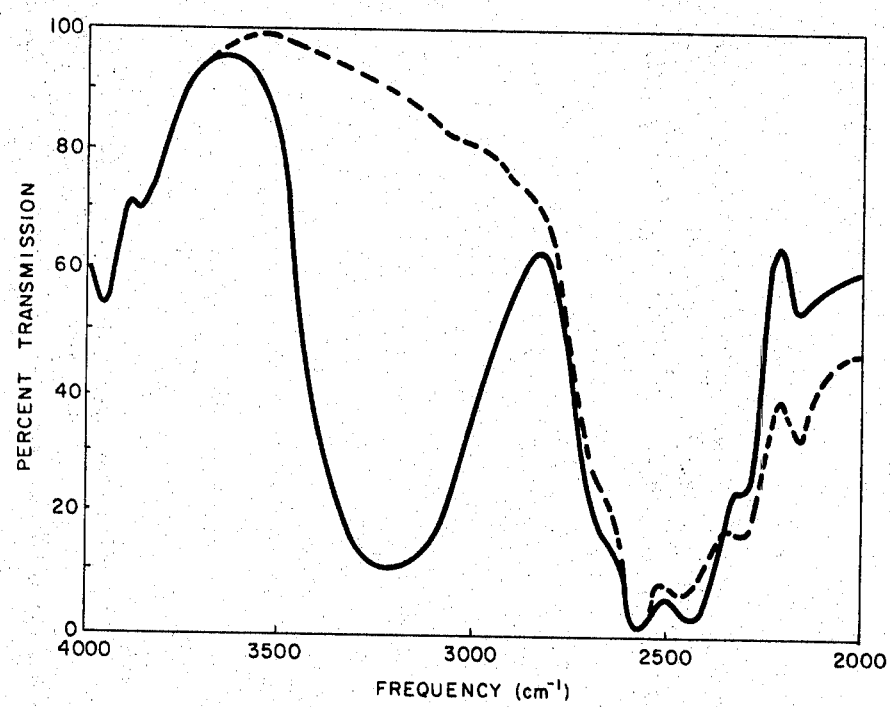
FIG. 3 shows transmission curves for an active medium prepared in accordance with the present invention and for an active medium which includes hydrogen-containing species.

The solid curve of FIG. 3 shows a portion of the transmission spectrum of the $Nd:POCl_3:SnCl_4$ medium prepared in accordance with the present invention wherein the hydrogen-containing species are removed. The broken curve shows the transmission in this portion of the spectrum of a $Nd:POCl_3:SnCl_4$ medium intentionally contaminated with water. The 3000 to 3500 A. region of the spectrum corresponds to the absorption band of the OH bond. The comparison of these two curves clearly demonstrates that the present method of preparation results in the removal of substantially all of the hydrogen-containing species from the medium.

While the above description has referred to a specific embodiment of the invention, it will be recognized that many modifications and variations may be made therein without departing from the spirit and scope of the invention.

What is claimed:
1. A method of preparing an active medium for a liquid laser which comprises the steps of
    (a) forming a mixture by dispersing a compound containing an active laser ion in a solvent consisting essentially of phosphorus oxychloride and a Lewis acid;
    (b) adding sufficient water to said mixture to promote dissolution of said compound in said solvent, the resulting solution including hydrogen-containing species; and
    (c) boiling said solution in an anhydrous atmosphere to remove sufficient solvent to carry off substantially all hydrogen-containing species therefrom, the resultant active laser medium being in the form of a gel.
2. The method of claim 1 wherein the water added to the mixture to promote dissolution of the compound is in the range of 1:2 to 1:100 mole ratio with the phosphorus oxychloride.
3. The method of claim 1 wherein the water added to the mixture to promote dissolution of the compound is added in approximately 1:10 mole ratio with the phosphorus oxychloride.
4. The method of claim 1 wherein the compound dispersed in the solvent of phosphorus oxychloride and a Lewis acid contains a rare earth element.
5. The method of claim 1 wherein the compound is dispersed in an approximately 5 to 1 volume mixture of phosphorus oxychloride and a Lewis acid.
6. The method of claim 1 wherein the compound is selected from the group consisting of oxides and chlorides of rare earth elements.
7. The method of claim 6 wherein said rare earth element is neodymium.
8. The method of claim 1 wherein said Lewis acid is selected from the group consisting of tin tetrachloride, antimony pentachloride, germanium tetrachloride, titanium tetrachloride and sulfur trioxide.
9. The method of claim 1 wherein said Lewis acid is tin tetrachloride.
10. The method of claim 1 wherein the resultant active laser medium is diluted with an aprotic solvent to decrease the viscosity and concentration of said medium.
11. The method of claim 10 wherein said aprotic solvents are selected from the group consisting of phosphorus oxychloride and sulfuryl chloride.

References Cited

Blumenthal et al.: "New Room-Temperature Liquid Laser: Nd(III) in $POCl_3$–$SnCl_4$, The Journal of Chemical Physics, vol. 48, No. 12, June 15, 1968, p. 5726.

TOBIAS E. LEVOW, Primary Examiner

R. D. EDMONDS, Assistant Examiner

U.S. Cl. X.R.

252—301.4P, 301.4F, 301.4S